United States Patent [19]

Hayashi

[11] Patent Number: 4,692,110
[45] Date of Patent: Sep. 8, 1987

[54] APPARATUS FOR STRETCHING PLASTIC DOUGH

[75] Inventor: Torahiko Hayashi, Utsunomiya, Japan

[73] Assignee: Rheon Automatic Machinery Co., Ltd., Japan

[21] Appl. No.: 771,887

[22] Filed: Sep. 3, 1985

[30] Foreign Application Priority Data

Aug. 31, 1984 [JP] Japan .............................. 59-183405

[51] Int. Cl.$^4$ .............................................. A21C 3/02
[52] U.S. Cl. .................................. 425/335; 425/337; 425/367; 425/373; 425/DIG. 108
[58] Field of Search .............. 425/238, 505, 583, 374, 425/335, 337, 366, 367, 373, DIG. 108

[56] References Cited

U.S. PATENT DOCUMENTS

| | | | |
|---|---|---|---|
| 3,753,638 | 8/1973 | Simpson | 425/363 |
| 3,973,895 | 10/1976 | Hayashi | 425/372 |
| 4,178,147 | 12/1979 | Hayashi | 425/372 |
| 4,192,636 | 3/1980 | Hayashi et al. | 425/96 |
| 4,266,920 | 5/1981 | Hayashi et al. | 425/133.1 |

Primary Examiner—Jan H. Silbaugh
Assistant Examiner—Leo B. Tentoni
Attorney, Agent, or Firm—Guy W. Shoup

[57] ABSTRACT

An apparatus for stretching plastic dough is provided. A plurality of conveyors arranged in series and a plurality of rollers disposed above the conveyors cooperatively act to stretch dough fed therebetween. The plurality of rollers are freely rotatable and the shafts thereof are fixed to connecting arms which can reciprocate above the conveyors to make the dough less thick.

4 Claims, 4 Drawing Figures

APPARATUS FOR STRETCHING PLASTIC DOUGH

BACKGROUND OF THE INVENTION

1. Field of the Invention

The present invention is for an apparatus to stretch plastic dough having viscoelasticity, such as bread or confectionery dough, and more particularly for an apparatus to effectively stretch the dough by a simple and reliable mechanism.

2. Description of Prior Art

U.S. Pat. No. 3,973,895 teaches an apparatus to form dough pieces where a plurality of rollers are assembled into an oval circuit and is located above a plurality of conveyors.

Although dough fed between the rollers and the conveyors is smoothly stretched in the apparatus of this prior art, it requires a complex mechanism to transmit power to rotate the conveyors about their axes and along an endless roller path, and a large number of rollers are required.

SUMMARY OF THE INVENTION

It is an object of the present invention to provide an apparatus by which the dough is effectively stretched without the use of a complex mechanism.

It is another object of this invention to provide such an apparatus that production costs are low and handling and maintenance is easier.

In accordance with the present invention, an apparatus for stretching dough is provided, which comprises a plurality of serial conveyors operable at different speeds, and a plurality of rollers above the conveyors, the rollers being freely rotatable about their axes and moving back and forth along the conveyance path of the conveyors, the lower portion of the rollers forming a straight portion spaced apart from and above the conveyors by a predetermined distance.

An apparatus of the present invention comprises a plurality of conveyors arranged in series and a plurality of rollers disposed above the conveyors. The conveyors are driven at different speeds, and preferably a downstream conveyor is driven at a speed higher than that of an upstream conveyor because of the effective stretching of the dough at a stage between the two conveyors. Each of the shafts of the rollers is connected to each slide member which is slidably mounted on a roller frame on each side of the apparatus. The roller frames are mounted on a frame on which the conveyors are also mounted.

Since each shaft is connected to a connecting arm which is connected to a crank arm, which crank arm is moved by a motor, the rollers can move back and forth together in unison. The speed of movement of the rollers is preferably substantially higher than that of any of the conveyors. The rollers can also rotate about the shafts by means of their frictional contact with the dough or by means of rolling friction from friction plates mounted to the roller frames, whereby the dough fed between the rollers and the conveyors is pressed, leveled, and rolled out into a less thick dough sheet.

Thus, according to the present invention, a simple but reliable stretching apparatus rolls out the dough with the same efficiency as that of a stretching apparatus having an endless roller mechanism requiring many rollers, gearings, sprockets, chains, and so forth.

In addition, changes in the distance between the rollers and the conveyors, and the angle of the straight portion of the rollers with the conveyors, can respond to various dough thicknesses and many kinds of dough with different rheological properties. As will be seen by the aformentioned explanation, whereas the apparatus according to the present invention is composed simply of a plurality of serially arranged conveyors and a plurality of rollers positioned above the conveyors, an excellent stretching effect can be achieved. Consequently, this apparatus is very applicable to industies treating various plastic and viscoelastic materials, in addition to food companies manufacturing dough and the like.

DESCRIPTION OF THE PREFERRED EMBODIMENTS

Figure 1:
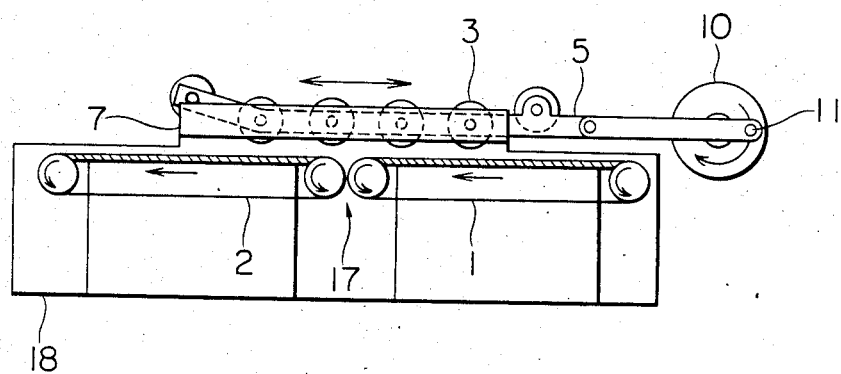
FIG. 1 is a side elevational view of an embodiment of the present invention.

An embodiment of the present invention will now be described with reference to the drawings. In FIG. 1, an upstream conveyor 1 and a downstream conveyor 2 are disposed in series on a frame 18. These conveyors are driven in a direction as shown by the arrows in the figure but are driven in the reverse direction if desired. The conveying speed of the downstream conveyor 2 is higher than that of the upstream conveyor 1. When these conveyors are driven reversely, the speed of conveyor 1 is higher than that of conveyor 2.

Figure 2:
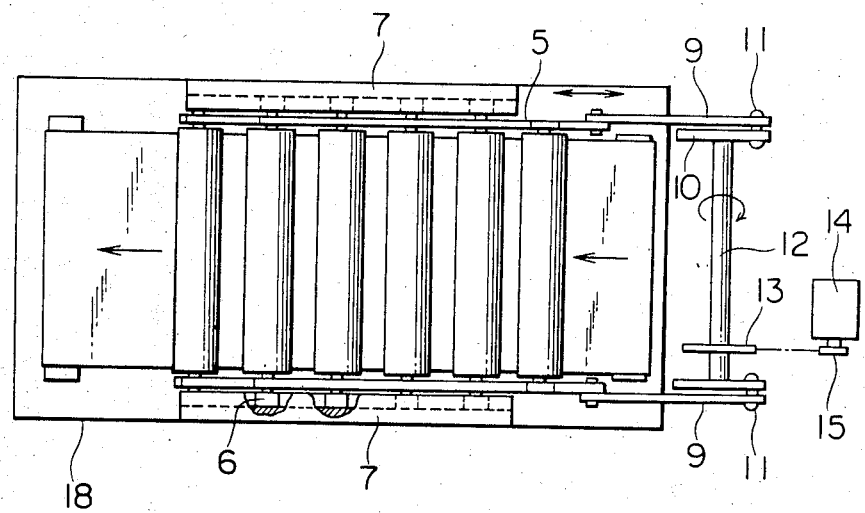
FIG. 2 is a plan view of the embodiment described in FIG. 1.
Figure 3:
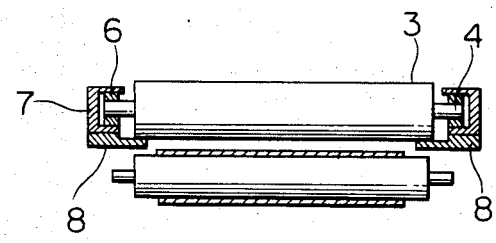
FIG. 3 is a fragmentary sectional view of a roller and a conveyor of the embodiment described in FIG. 1.
Figure 4:
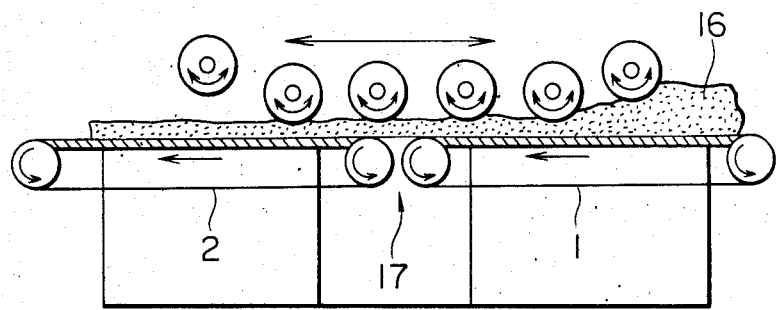
FIG. 4 diagrammatically illustrates an embodiment of the invention.

In FIGS. 1, 2, and 3, a plurality of rollers 3 are parallel. These rollers are on the same plane except for two rollers at the upstream and downstream ends, and the two rollers are located slightly above the plane, because, when larger mass of dough is stretched, it is easily fed between the roller and the conveyor, as shown in FIG. 4. Each roller is mounted on a shaft 4 about which it rotates. The shaft 4 extends beyond the roller at each end. Slide members 6 of a suitable shape, for instance, rectangular in cross-section, are fixed to each end of the shafts 4 and are adapted to be slidable within the recess of each of roller frames 7, 7, which are U-shaped in cross-section and mounted on the frame 18, on both sides of the rollers. The shafts 4 are fixedly connected to a pair of connecting arms 5, 5 in the vicinity of each end of the rollers 3. The connecting arm 5 is a plate horizontally disposed and with holes to receive the shafts 4. The connecting arms 5, 5 at both ends of the rollers are rotatably connected to one end of each of a pair of crank arms 9, 9. The other end of each of the crank arms 9, 9 is rotatalby connected by means of a pin 11 to a point near the circumference of one of a pair of discs 10, 10, which are mounted on both ends of a rotary shaft 12 supported by the frame of the apparatus. A sprocket 13 is mounted on the rotary shaft 12 and is connected to a sprocket 15 of a motor 14 with a chain. When the motor 14 rotates, the sprocket 15 then rotates and so causes the sprocket 13 to rotate. The rotation of the sprocket 13 causes the rotary shaft 12 and the discs 10, 10 to rotate. Since the pins 11, 11 are eccentrically connected to the discs 10, 10, the crank arms 9, 9 make a crank motion to cause a reciprocally linear motion of the connecting arms 5, 5.

The rollers 3 are adapted to freely rotate about the shafts 4. A pair of friction plates 8, 8 are mounted on the bottom of the frames 7, 7 to frictionally engage the rollers 3 as shown in FIG. 3. By the reciprocal motion of the roller frames 7, 7, the rollers 3 move back and forth and at the same time roll by means of rolling friction from the friction plates 8, 8, whereby dough 16, fed on the upstream conveyor 1, is initially leveled on the conveyor 1. The speed of the reciprocal motion of the connecting arms 5, 5 is preferably substantially higher than the conveying speed of any of the conveyors 1, 2, so that the reciprocal motion is repeated several times until the dough 16 is transferred onto the downstream conveyor 2. Since the conveying speed of the downstream conveyor 2 is higher than that of the upstream conveyor 1, an extension of the dough 16 can be smoothly carried out, resulting in dough of a desired thickness.

As described before, the dough can be fed from the other end of this apparatus if the conveying direction is reversed and the conveying speed of each of the conveyors is adjusted. Even if no friction plate is provided in this apparatus, the rollers 3 can still roll out the dough by means of the rolling friction, with the dough thereby achieving the object of the present invention. Although in the apparatus the roller frames 7, 7 and the conveyors 1 and 2 are described as being fixedly mounted on the frame 18, the addition of a height-adjusting mechanism to the roller frames or the conveyors can feed dough of various thicknesses onto the apparatus. The number of the rollers may be changed to enable the apparatus to more suitably stretch dough of different rheological features. Further, the roller frames 7, 7, and consequently, the rollers 3, are parallel with the conveying path, but the conveying path may be inclined relative to the rollers to easily receive the dough and to effectively stretch the dough. It will be seen from the above description that the apparatus of the present invention is simple in structure and easy to operate and still can attain the same result as that of the prior art apparatus.

I claim:

1. An apparatus to stretch plastic dough, comprising:
   a plurality of serially disposed conveyors operable at different speeds;
   a plurality of rollers above the conveyors, the rollers being freely rotatable about their axes and driven together in linear reciprocation only back and forth along the conveyance path of the conveyors, the lower portion of the rollers forming a straight portion spaced apart from and above the conveyors by a selected distance for the desired thickness of the dough;
   means for driving said plurality of conveyors in the same direction with a conveyor downstream in said direction being driven at a faster speed than a conveyor upstream of said direction in order to provide a stretching action to said plastic material; and
   means for driving said plurality of rollers together in linear reciprocation only back and forth above the conveyance path.

2. An apparatus of claim 1, wherein the distance between the straight portion of the rollers and the conveyors is adjustable.

3. An apparatus of claim 1, wherein the straight portion of the rollers is inclined relative to the conveyance path toward the upstream end of the conveyance path at an inclined angle suitable for receiving the dough to be stretched.

4. An apparatus of claim 1, wherein the level of the conveyance path of each of the conveyors is independently adjustable.

* * * * *